United States Patent
Hekstra et al.

(10) Patent No.: US 6,704,451 B1
(45) Date of Patent: Mar. 9, 2004

(54) METHOD AND ARRANGEMENT FOR OBJECTIVE ASSESSMENT OF VIDEO QUALITY

(75) Inventors: Andries Pieter Hekstra, Voorschoten (NL); John Gerard Beerends, Hendstdijk (NL); Robert Hendrik Koenen, Rotterdam (NL); Franciscus Elisabeth De Caluwe, Amsterdam (NL)

(73) Assignee: Koninklijke KPN N.V. (NL)

( * ) Notice: Subject to any disclaimer, the term of this patent is extended or adjusted under 35 U.S.C. 154(b) by 0 days.

(21) Appl. No.: 09/601,901

(22) PCT Filed: Mar. 2, 1999

(86) PCT No.: PCT/EP99/01403
§ 371 (c)(1),
(2), (4) Date: Oct. 17, 2000

(87) PCT Pub. No.: WO99/45715
PCT Pub. Date: Sep. 10, 1999

(30) Foreign Application Priority Data

Mar. 2, 1998 (EP) ............................................ 98200643

(51) Int. Cl.[7] .................................................. G06K 9/48
(52) U.S. Cl. ........................ 382/199; 382/266; 348/192
(58) Field of Search ................................ 382/112, 199, 382/206, 228, 254, 266, 269, 272; 348/180, 181, 184, 192, 193; 358/504; 714/712

(56) References Cited

U.S. PATENT DOCUMENTS 5,329,379 A * 7/1994 Rodriguez et al. .......... 382/167
5,446,492 A * 8/1995 Wolf et al. .................. 348/192
5,596,364 A * 1/1997 Wolf et al. .................. 348/192

OTHER PUBLICATIONS

Wolf, et al. "Objective quality assessment of digitally transmitted video".*

Voran, Stephen, "The Development of Objective Video Quality Measures that Emulate Human Preception", *GLOBECOM '91, IEEE*, 1991, pp. 1776–1781.

* cited by examiner

*Primary Examiner*—Daniel Mariam
(74) *Attorney, Agent, or Firm*—Michaelson & Associates; Peter L. Michaelson

(57) ABSTRACT

A method of and an arrangement for obtaining quality indicators for an objective assessment of a degraded or output video signal with respect to a reference or input video signal. The strength of edges or signal transitions in both the input and the output video signals are calculated to provide input and output edge signals. By processing the edge signals, introduced edges and omitted edges in the output edge signal are established. For each of the luminance and chrominance signals of a color video signal first and second quality indicators are obtained from normalized values of the introduced edges and omitted edges, relative to the output edge signal and the input edge signal normalized by first and second normalization factors, respectively. By using smeared Sobel filtering, correlation of calculated MOS and observed MOS by human test persons reaches a value of above 0.9.

21 Claims, 4 Drawing Sheets

METHOD AND ARRANGEMENT FOR OBJECTIVE ASSESSMENT OF VIDEO QUALITY

FIELD OF THE INVENTION

The present invention relates to video quality and, in particular, to an objective assessment of the quality of coded and transmitted video signals.

BACKGROUND OF THE INVENTION

With the development of digital coding technology savings in transmission and/or storage capacity of video signals have been achieved and a large number of new muti-media video services have become available.

Savings in transmission and/or storage capacity by digital compress technology generally depend upon the amount of information present in the original video signal, as well as how much quality the user is willing to sacrifice. Impairments may result from the coding technology used and limited transmission channel capacity.

Video quality assessment can be split into subjective assessment by human observers providing their subjective opinion on the video quality, and objective assessment which is accomplished by use of electrical measurements.

It is the general opinion that assessment of video quality is best established by human observers which is, however, a complex, costly and time consuming approach. Accordingly, there is a need to develop objective visual quality measures, based on human perception, that can be used to predict the subjective quality of modern video services and applications.

Studies in the framework of the American National Standards Institute (ANSI) and the International Telecommunication Union (ITU) have led to a plurality of algorithms for objective video quality assessment.

As will be appreciated by those skilled in the art, calculation of quality indicators of video signals on a pixel bases, for example, requires a large amount of processing. As disclosed in a conference publication by S. D. Voran "The development of objective video quality measures that emulate human perception", Globocom '91 conf. publ. vol. 3, pp. 1776–1781, 1991, an important class of disturbing distortions in a video signal are those that destroy, soften, blur, displace, or create edges or signal transitions in the video image.

In a further conference publication by S. D. Voran and S. Woff "An objective technique for assessing video impairments", IEEE Pacific RIM Conference on Communications, Computers and Signal Processing, Proceedings Volume 1 of 2, pp 161–165, 1993, an objective technique is described, which is based on digital image processing operations performed on digitized original and impaired video sequences. The technique implies a features extraction process in which so called impairment measurements of perceptual video attributes in both the spatial and temporal domains are determined. The spatial impairment measurement is based on a Sobel filtering operation or, alternatively, a "pseudo-Sobel" operation, in order to enhance the edge content in the video image, and consequently in the spatial impairment measurement. The spatial impairment measurement is based on normalised energy differences of the Sobel-filtered video frames using standard deviation calculations conducted over visible portions of the pixel arrays of the original and impaired video signals. The impairment measurements thus extracted from the original and impaired video sequences are then used to compute a quality indicator that quantifies the perceptual impact of the impairments present in the impaired video sequence. The patent publication U.S. Pat. No. 5,446,492 discloses a similar technique in which the feature-extraction processes on the original and impaired video sequences are carried out at distantly apart source and destination locations. The features extracted from the original video sequence are such that they can be easily and quickly communicated between the source and destination locations via a separate low-bandwidth transmission path, i.e. the bandwidth of the source features is much less than the bandwidth of the original video sequence. To this end the feature-extraction process additionally includes a statistical subprocess which subjects the output of the Sobel filtering operation to a statistical processing, i.e. the computation of the standard deviation of the pixels contained within a so called region of interest for which the video quality is to be measured.

A drawback of these known techniques is the fact that the feature-extraction process is based on standard deviation calculations. One thing and another means that image distortions having contrary effects in the Sobel frames, e.g. blurring vs additional noise or false edges, can not always be detected. A further drawback is that the known techniques use a relative distance measure for the quality of perception, which consequently is sensitive for relative effects of very small size and as such of small visibility.

SUMMARY OF THE INVENTION

The present invention aims to provide objective quality measures that can be used to assess the subjective quality of video signals, dealing with the higher levels of cognitive processing which dominate the perception of video quality.

It is a further object of the present invention to provide such measures applicable for standardisation.

It is a still further object of the present invention to provide a method, an arrangement and equipment for objective quality assessment of degraded video signals for measuring the quality of video coding equipment and algorithms, video transmissions and other multimedia video services, and which among other things do not have the above mentioned drawbacks.

These and other objects and features are achieved by the present invention in a method of obtaining quality indicators for an objective assessment of a degraded or output video signal with respect to a reference or input video signal by quantifying the strength of edges or signal transitions in both the input and the output video signals using edge or signal transition detection, which method comprises a first main step of generating image features of the input and output video signals, and a second main step of determining quality indicators from the generated image features, and for the definition of which method the prior art of document U.S. Pat. No. 5,446,492 has been used. The process of quantifying the strength of the edges will hereinafter be referenced by the term edginess.

The method according to the invention includes in the first main step the steps of:

a) detecting edges in the input and the output video signals; and b) calculating the edginess of the input and the output video signals, providing input and output edge signals; and in the second main step the steps of c) establishing introduced edges in the output edge signal by comparing the input and output edge signals of corresponding parts of the input and output video signals, introduced edges being edges which are present in the output edge signal and are absent at corresponding positions in the input edge signal;

d) establishing omitted edges in the output edge signal by comparing the input and output edge signals of corresponding parts of the input and output video signals, omitted edges being edges which are present in the input edge signal and are absent at corresponding positions in the output edge signal;

e) obtaining normalised values of the introduced edges relative to the output edge signal adjusted by a first normalisation factor;

f) obtaining normalised values of the omitted edges relative to the input edge signal adjusted by a second normalisation factor;

g) calculating a first quality indicator by averaging the values obtained in step e); and h) calculating a second quality indicator by averaging the values obtained in step f).

The method according to the invention is based on human visual perception, charactrised in that spatial distortions like the introduction and omission of edges or signal transitions have a great impact on the subjective quality of the video signal. Further, it has been found that the introduction of an edge is more disturbing than the omission of an edge.

This has been taken into account, in the method according to the invention, by obtaining normalised values of the introduced edges and the omitted edges. The introduced edges are normalised with respect to the output edge signal adjusted by a first weighing or normalisation factor an the omitted edges are normalised with respect to the input edge signal adjusted by a second weighing or normalisation factor. Obtaining normalised values according to the present invention is more in line with human perception, which is always relative.

The quality indicators for both the introduced and the omitted edges are subsequently established by calculating mean values of the thus normalised introduced and omitted edges or signal transitions in the output video signal.

For a number of different types of video signals, classified by the amount of motion in the pictures, the quality indicators indicators obtained with the invention are dose to the quality indicators obtained from subjective measurements by human observers.

In a preferred embodiment of the method according to the invention, the proportions of introduced and omitted edges are established from respective polarities of a bipolar distortion signal formed from difference building of aligned, corresponding unipolar input and output edge signals of corresponding parts of the input and output video signals.

The first and second normalisation factors may be fixed or, preferably, set in accordance with the characteristics of the video signals, such as the luminance and chrominance values thereof.

For high luminance values, edge deteriorations are less visible which, in a further embodiment of the invention, is taken into account in that the first normalisation factor comprises a variable part obtained from the maximum characteristic values of the video signals, such as the luminance signal.

Calculation of the edginess can be established in a variety of manners. However, the most straigthforward mathematical formulation is to calculate the norm of the gradient of the video signals. An example hereof is Sobel filtering which has proven to provide reliable results. Depending on how derivates of the video signals are approximated, many variations in the calculation of the edginess are feasible. All these types hereinafter will be referred to as Sobel filtering.

In a preferred embodiment of the invention, in particular wherein the introduced and omitted edges are obtained from a distortion signal formed from aligned input and output edge signals, improved or smeared Sobel filtering provides excellent results. With smeared Sobel filtering, a smearing operator having a width of, for example, 3 pixels is used. By this smearing operation, the effect of misalignment in the formation of the distortion signal is compensated for.

Alignment of the input and output edge signals is required because video sequences processed by a codec or transmitted over a transmission channel, for example, show delays with respect to the original sequence and which vary from picture to picture. If the video sequence contains relative little motion, there is only a little influence on the objective video quality measure. However, with large movements the omission of delay compensation leads to a large mismatch in scene content between original and distorted sequences. This inadvertently increases the computed distortions. To solve the time varying delay problem, known alignment algorithms can be used such as disclosed by ITU-T Contribution COM-12-29, "Draft new recommendation on multimedia communication delay, synchronisation, and frame rate measurement", December 1997.

In practice, in accordance with the invention, the quality indicators are obtained from the luminance and chrominance representations of a colour video signal.

Heuristic optimisation has led to quality indicators obtained from smeared Sobel edge detection wherein for the luminance signals the constant part of the first normalisation factor is in a range between 15 and 30, preferably 20; the constant part of the second normalisation factor is in a range between 5 and 15, preferably 10; and the variable part of the first normalisation factor is in a range between 0.3 and 1, preferably 0.6 times the maximum edge values of the luminance signal of the input and output video signals. For the chrominance signals, the constant part of the first and second weighing factors is in a range between 5 and 15, preferably 10.

From the thus obtained first and second quality indicators of each the luminance and chrominance signals, weighted quality indicators are obtained. For example, using multiple linear regression techniques. For a Mean Opinion Score (MOS) calculated from the weighted quality indicators obtained from the above smeared Sobel filtering and preferred weighing factors, correlation of the calculated MOS and observed MOS from subjective measurements reaches a value of above 0.9 which is required for making reliable predictions.

The best results are obtained from training the method on subjective reference quality data such that the normalisation factors and/or weighing of the quality indicators are optimised.

The invention further provides an arrangement for obtaining quality indicators for an objective assessment of a degraded or output video signal with respect to a reference or input video signal by quantifying the strength of edges or signal transitions in both the input and the output video signals using edge or signal transition detection, which arrangement comprises means for generating image features of the input and output video signals and means for determining quality indicators from the generated image features, for the definition of the arrangement the document U.S. Pat. No. 5,446,492 has been used. The arrangement according to the invention includes in the means for generating image features:

a) means for detecting edges in the input and the output video signals; and
b) means for calculating the edginess of the input and the output video signals, providing input and output edge signals; and in the means for determining quality indicators;
c) means for establishing introduced edges in the output edge signal by comparing the input and output edge signals of corresponding parts of the input and output video signals, introduced edges being edges which are present in the output edge signal and are absent at corresponding positions in the input edge signal;
d) means for establishing omitted edges in the output edge signal by comparing the input and output edge signals of corresponding parts of the input and output video signals, omitted edges being edges which are present in the input edge signal and are absent at corresponding positions in the output edge signal;
e) means for obtaining normalised values of the introduced edges relative to the output edge signal adjusted by a first normalisation factor;
f) means for obtaining normalised values of the omitted edges relative to the input edge signal adjusted by a second normalisation factor;
g) means for calculating a first quality indicator by averaging the values obtained in step e); and
h) means for calculating a second quality indicator by averaging the values obtained in step f).

In a preferred embodiment, the edge detection and calculation means comprise improved or smeared Sobel filter means.

Those skilled in the art will appreciate that the means mentioned above under a) and b) can be physically combined or provided by a single means for both the input and output video signal using appropriate multiplexing means, for example. Likewise, means c) and d), and/or means e) and f) as well as means g) and h) may be combined or separate.

The arrangement as a whole can be implemented in suitable digital processor means and incorporated in an Application Specific Integrated Circuit (ASIC), for use in measuring the quality of video codecs and the quality of video transmissions, for example.

The above and other features and advantages of the present invention will be readily apparent to one of ordinary skill in the art from the following written description when read in conjunction with the drawings in which like reference numerals refer to like elements.

BRIEF DESCRIPTION OF THE DRAWINGS

FIG. 3a shows a video type picture and FIG. 3b shows edges or signal transitions in the picture of FIG. 3a.

DETAILED DESCRIPTION OF THE EMBODIMENTS

Two main categories of video quality assessment can be distinguished. That is subjective assessment and objective assessment. Objective assessment of video quality, such as for television broadcast, in the past has been accomplished through resolution charts, colour bars, frequency response measurements, and by measuring the signal to noise ratio of the video signal. With the introduction of advanced digital video coding and decoding techniques, classical objective quality measurements like signal to noise ratio and total harmonic distortion have been proven less useful. These classical objective visual quality measurements do not take the user into account who decides by its own subjective assessment whether a video signal meets an expected quality level. The availability of objective test methods that show a high correlation with the subjective quality is therefore important.

Figure 1:
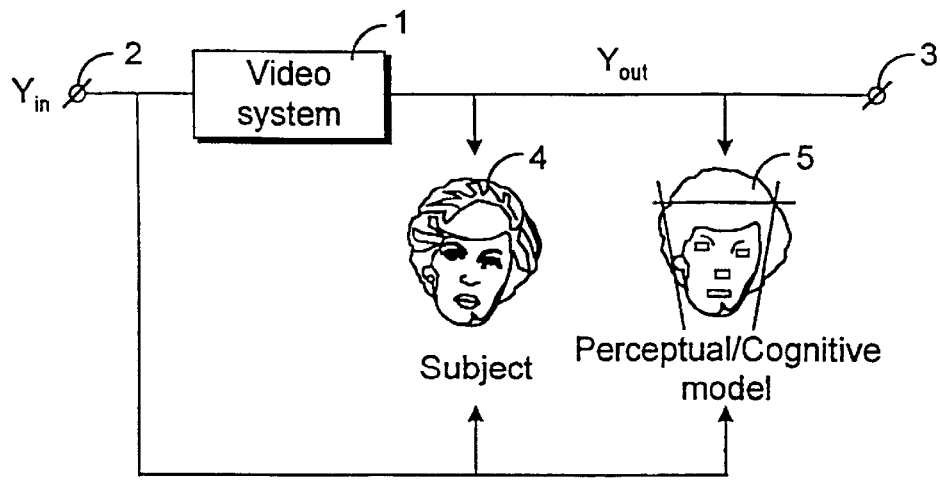
FIG. 1 shows an approach towards objective measurement of the quality of a video system wherein a perceptual/cognitive model simulates a human subject.

FIG. 1 shows a so-called black box approach towards objective measurement of the quality of a video system 1, such as a video codec (coder/decoder), a transmission device or transmission path etc.

A video input or reference signal $Y_{in}$ provided at an input terminal 2 is processed by the video system 1 into an output video signal $Y_{out}$ at an output terminal 3.

A human subject 4 receiving the output video signal $Y_{out}$ through his eyes, will not perceive any differences between the input and output video signals for an ideal video system 1. However, in practice, the video system 1 will degrade the output compared to the input, leading to a quality impression by the human subject. The level of the quality impression is determined both by the perception of the input and output signals by the human subject, i.e. his visual organs, as well as his cognition, i.e. the manner in which the perceived signals are interpreted by his brains.

Accordingly, objective quality assessment of video signals correlating with subjective quality impressions, has to be based on both a perceptual and cognitive model 5.

Figure 2:
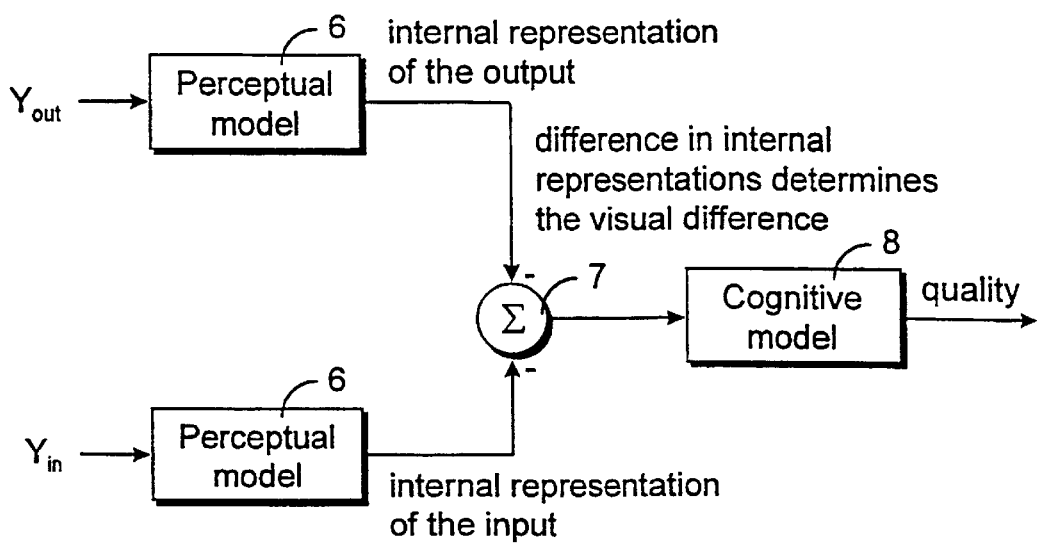
FIG. 2 shows, in a schematic representation, basic objective measurement following the approach shown in FIG. 1.

FIG. 2 shows the basic principles of objective measurement, wherein a perceptual model 6 transforms the input and output video signals into an internal representation of the input and output video signals. The difference 7 in the internal representations is mapped at a quality level using a cognitive model 8. Perceptual models 6 are generally based on edge or signal transition, using spatial filters originating from the human visual system.

It is the aim of the present invention to assess the quality perception of a human subject in an as much as possible accurate manner from objective measurements.

Figures 3A, 3B:
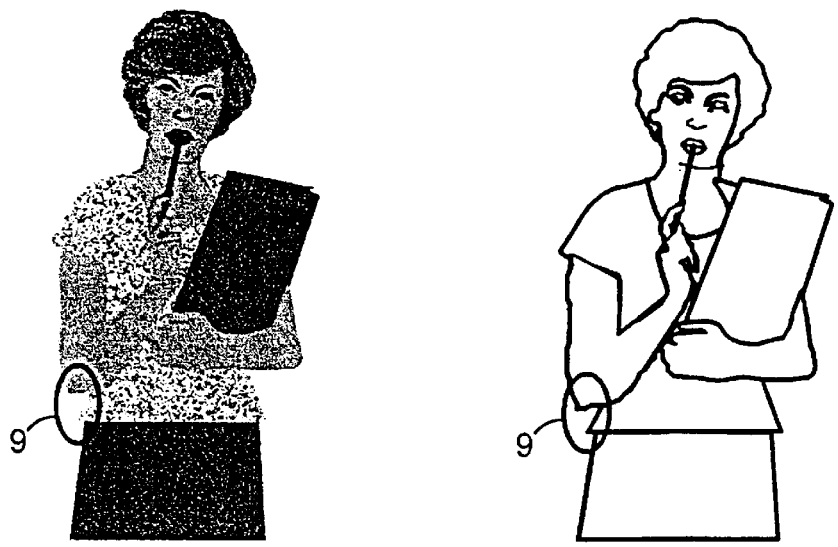

FIG. 3a shows a video type picture, whereas FIG. 3b shows edges or signal transitions detected in the picture. For illustration purposes, an arbitrary corresponding part in both figures is indicated by an ellips 9.

Figure 4:
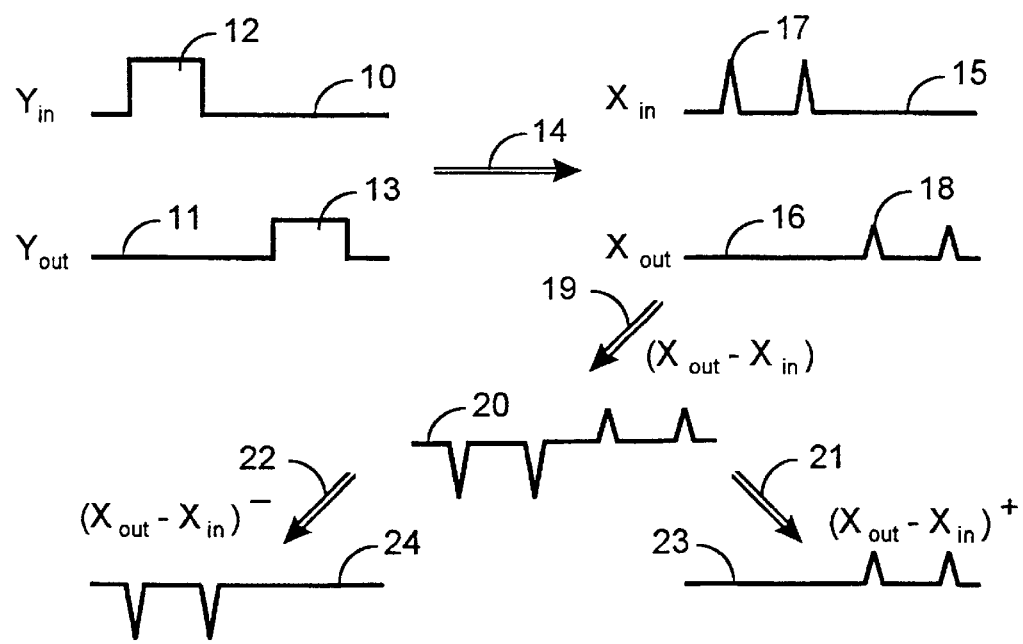
FIG. 4 shows, in a schematic and illustrative manner, an exemplary embodiment of establishing introduced and omitted edges in an output video signal.

The invention is primarily based on edge or signal transition detection of a video signal as illustrated, by way of example, in FIG. 4.

Signal parts 10 and 11 of an input video signal $Y_{in}$ and an output video signal $Y_{out}$, respectively, are time and space aligned in order to rule out inherent time delays or spatial shifts in the video system 1 (FIG. 1). The signal part 10 comprises an edge or signal transition 12, as shown, while signal part 11 comprises an edge or signal transition 13, shifted in position with respect to edge 12 and of a lower amplitude. In the present example, edge 13 is assumed to be a new or introduced edge in the output signal $Y_{out}$.

In the ideal undistorted case, both signal parts 11 and 12 have edges at the same position and of the same amplitude, such that they cancel each other in a distortion signal formed by difference building.

The signal parts 10 and 11 are subjected to an edge operator, indicated by an arrow 14, for quantifying the strength of the edges 12 and 13, providing edge signals $X_{in}$ and $X_{out}$, respectively, referenced by numerals 15 and 16.

As shown, the edge signals are of a unipolar nature, i.e. for both the leading and trailing portions of the edges 12 and 13 correspondingly positioned positive pulses 17 and 18 are provided.

In a next step, indicated by an arrow 19, a distortion signal 20 is formed by substraction of the edge signal 15 from the edge signal 16, i.e. $(X_{out}-X_{in})$. This distortion signal 20 is of a bipolar nature, as shown. From the distortion or difference signal 20 introduced and omitted edges are established as indicated by arrows 21 respectively 22.

The positive part of the bipolar distortion signal 20, i.e. noted $(X_{out}-X_{in})^+$, provides introduced edges in the output signal 11. That is, the edge 13 which is not present in the input signal. The negative portion of the distortion signal 20, i.e. noted $(X_{out}-X_{in})^-$, provides the omitted edges in the output signal 11, that is the edge 12 of the input signal 10 which is not present in the output signal 11.

Those skilled in the art will appreciate that edge detection for the purpose of the present invention can be established by a differentiation or derivative operation, generating a plurality of edge magnitude values based on the image values, i.e. referenced as edginess.

In a preferred embodiment of the invention, the edge detector can be a Sobel operator that generates the magnitude values from the derivative of the image values, i.e. the rate of change of intensity over a plurality of image pixels.

Sobel filtering is an operation which is well known in the art of image processing and can be found in many text books on this subject, such as "Digital Image Processing", by R. C. Gonzalez and P. Winz 2nd Ed.; Addison-Wesley Publishing Co., Reading, Mass., 1987.

In the classical Sobel filtering, the rate of change of the pixels of a video image along the x-axis, i.e. the horizontal edges, is determined by convolving the video image with the matrix:

| -1 | -2 | -1 |
|----|----|----|
| 0  | 0  | 0  |
| 1  | 2  | 1  |

The rate of change of the pixels of the video image along the y-axis, i.e the vertical edges, is determined by convolving the image with the matrix:

| -1 | 0 | 1 |
|----|---|---|
| -2 | 0 | 2 |
| -1 | 0 | 1 |

The square root of the sum of both edge detectors provides the edge magnitude in a pixel or point of the video image.

The invention makes use of the insight that human perception is a relative operation, such that a weighing or normalization of the introduced and omitted edges is established.

Accordingly, the introduced edges are normalized relative to the output edge signal adjusted by a first normalization factor and the omitted edges are normalised relative to the input edge signal adjusted by a second normalization factor. This leads to the following equations:

$$Q1 = mean\frac{(X_{out} - X_{in})^+}{X_{out} + W1} \quad (1)$$

$$Q2 = mean\frac{(X_{out} - X_{in})^-}{X_{in} + W2} \quad (2)$$

wherein:
Q1=first quality indicator for introduced edges.
Q2=second quality indicator for omitted edges.
W1=first normalization factor.
W2=second normalization factor.

The quality factors are separately calculated for the luminance and chrominance parts of colour video signals. The normalization factors W1 and W2 are set in accordance with the characteristics of the video signals and may comprise a constant part corresponding to luminance and chrominance values of the video signals.

In a preferred embodiment of the invention, the first normalization factor comprises a variable part obtained from the maximum edge values of the input and output video signals. Preferably, the maximum edge values of the luminance signal of the input and output video signals. This, because edge deteriorations for high luminance values are less visible. Applying Sobel operation as the edge operator in accordance with the invention, equations (1) and (2) can be written as:

$$Q1 = mean\frac{\{Sobel(Y_{out}) - Sobel(Y_{in})\}^+}{Sobel(Y_{out}) + W1} \quad (3)$$

$$Q2 = mean\frac{\{Sobel(Y_{out}) - Sobel(Y_{in})\}^-}{Sobel(Y_{in}) + W2} \quad (4)$$

wherein:
Sobel(Y) is Sobel filtering of the video signal Y.

As discussed above, for the purpose of the present invention, the input and output video signals have to be time and space aligned.

In order to correct for misalignments and to adapt the processing with respect to the spatial resolution of the video signal, the Sobel filter has been enhanced by a so-called Smearing operator, having a width of a few pixels. Use of this smearing operator has the effect of extending the Sobel filter operation over the image pixels.

A three pixel width smearing of the filtered signal is defined as:

Smeared Sobel $(Y)$=MAX$\{i$=-1,0,1 $j$=-1,0,1 Sobel$_{i,j}(Y)\}$ (5)

wherein:
i,j=pixels in x and y directions over which the Sobel filtering is extended.

Again, for reliable results, first and second quality indicators for introduced and omitted edges have to be separately calculated for the luminance and chrominance parts of a colour video signal.

From heuristic optimization, for the luminance signals, reliable results are provided by a first normalization factor W1 in a range between 15 and 30, preferably 20 and comprising a variable part in a range between 0.3 and 1, preferably 0.6 times the maximum edge values of the luminance signal, and a second normalization factor in a range between 5 and 15, preferably 10. For the chrominance signals, the first and second normalization factors are to be chosen in a range between 5 and 15, preferably 10.

Accordingly, for the luminance signals, in a preferred embodiment of the invention excellent quality indicators are obtained from:

$$Q1(L) = mean \frac{\{Smeared\ Sobel(Y_{out}^L) - Smeared\ Sobel(Y_{in}^L)\}^+}{Smeared\ Sobel(Y_{out}^L) + 10 + 0.6\ MAX(X_{in}^L, X_{out}^L)} \quad (6)$$

$$Q2(L) = mean \frac{\{Smeared\ Sobel(Y_{out}^L) - Smeared\ Sobel(Y_{in}^L)\}^-}{Smeared\ Sobel(Y_{in}^L) + 10} \quad (7)$$

wherein:
Q(L)=quality indicator for luminance signals
$Y^L$=luminance signal
$X^L$=edge luminance signal The rational for the factor 0.6 MAX ($X_{in}^L$, $X_{out}^L$) lays in the Weber law, which states that subjects are less sensitive to absolute contrast for large luminance values.

For both chrominances signals $C_R$ and $C_B$ of the video signals, quality indicators are obtained from:

$$Q1(C_R) = \frac{\{Smeared\ Sobel(Y_{out}^{C_R}) - Smeared\ Sobel(Y_{in}^{C_R})\}^+}{Smeared\ Sobel(Y_{out}^{C_R}) + 10} \quad (8)$$

$$Q2(C_R) = \frac{\{Smeared\ Sobel(Y_{out}^{C_R}) - Smeared\ Sobel(Y_{in}^{C_R})\}^-}{Smeared\ Sobel(Y_{in}^{C_R}) + 10} \quad (9)$$

$$Q1(C_B) = \frac{\{Smeared\ Sobel(Y_{out}^{C_B}) - Smeared\ Sobel(Y_{in}^{C_B})\}^+}{Smeared\ Sobel(Y_{out}^{C_B}) + 10} \quad (10)$$

$$Q2(C_B) = \frac{\{Smeared\ Sobel(Y_{out}^{C_B}) - Smeared\ Sobel(Y_{in}^{C_B})\}^-}{Smeared\ Sobel(Y_{in}^{C_B}) + 10} \quad (11)$$

wherein:
Q($C_R$)=quality indicator for chrominance $C_R$ signal.
Q($C_B$)=quality indicator for chrominance $C_B$ signal.
$Y^{C_R}$=chrominance $C_R$ signal.
$Y^{C_B}$=chrominance $C_B$ signal.

Using multiple linear regression techniques, a Mean Opinion Score (MOS) can be calculated from the six quality indicators obtained and three quality indicators derived from the LP-distance between the reference or input video signal and the degraded or output video signal. With the present invention, correlation of the calculated MOS and the observed MOS from subjective measurements of human test persons reaches a value of above 0.9 which is required for standardisation purposes within ANSI-ITU.

The normalization factors and weighing of the quality indicators can be further optimized from running the method according to the invention for subjective quality data for a number of training video sequences, for example.

Figure 5:
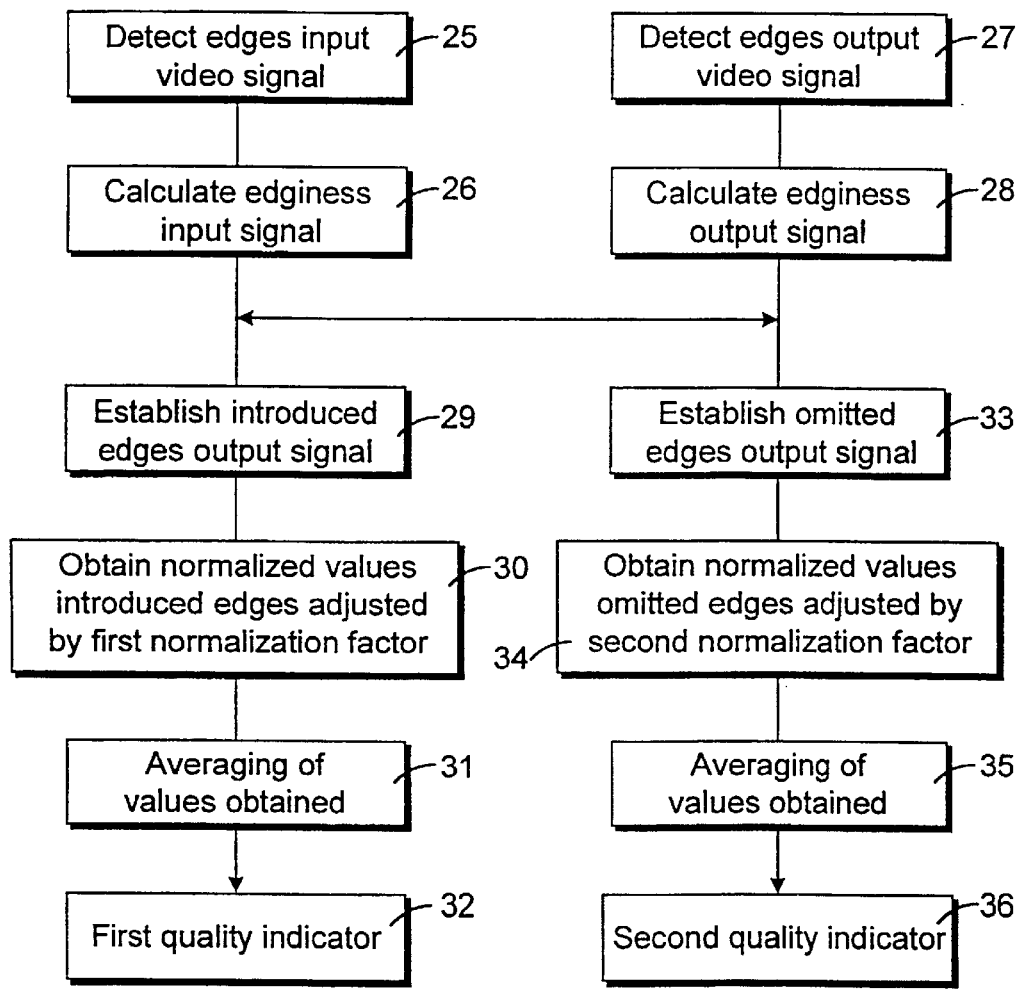
FIG. 5 shows a flow chart type diagram of the main embodiment of the method according to the invention.

FIG. 5 shows, in a flow chart type diagram, the main steps of the method according to the present invention.

Detection of edges and calculation of the edginess of the input video signal are schematically indicated by blocks 25 and 26, while blocks 27 1and 28 disclose same for the output video signal.

From the edge signals obtained in the blocks 26 and 28, introduced and omitted edges in the output signal are established, referenced by blocks 29 and 33, respectively.

In accordance with human perception, normalised values are obtained, by introducing a first and second normalization factor as indicated by blocks 30 and 34, respectively. The introduced edges are normalized with respect to the output edge signal, whereas the omitted edges in the output signal are normalized with respect to the input edge signal.

Averaging of the values obtained, blocks 31 and 35, leads to the first and second quality indicators according to the present invention, referenced by blocks 32 and 36, respectively.

Figure 6:
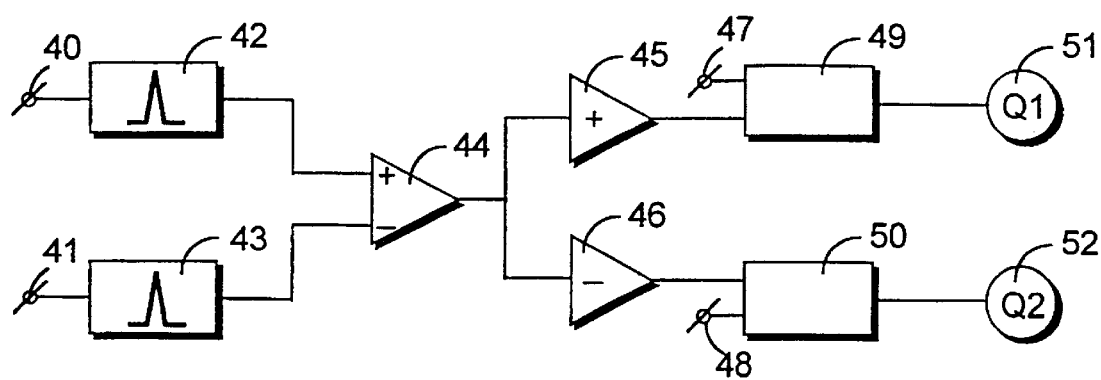
FIG. 6 shows a block diagram of an arrangement according to the present invention.

FIG. 6 shows a schematic block diagram of an arrangement for obtaining quality indicators for an objective assessment of video signal quality in accordance with the method of the invention.

At input terminal 40 an output video signal $Y_{out}$ is provided, time and space aligned with an input video signal $Y_{in}$, provided at input terminal 41. Edge detection and calculation means 42 and 43 are operative to detect edges and to quantify the strength of the edges, i.e. the edginess of the respective video signals, providing output and input edge signals, respectively. In a preferred embodiment of the invention, the means 42 and 43 are arranged for Sobel filtering of the video signals, in particular smeared Sobel filtering.

The edge signals provided are fed to means 44 for establishing a distortion signal or difference signal, such as the distortion signal 20 illustrated in FIG. 4.

Detection means 45 operate on the distortion signal for detecting introduced edges in the output edge signal and detection means 46 operate on the distortion signal to detect omitted edges in the output edge signal.

From the introduced edges, in combination with a first normalization factor applied at input terminal 47 of averaging means 49, a first quality indicator 51 is calculated. A second quality indicator 52 is calculated by averaging means 50 from the omitted edge signal in accordance with a second normalization factor applied at an input terminal 48 of the averaging means 50.

Those skilled in the art will appreciate that the edge detection and calculation means 42, 43 can be combined into single edge operator means, while using appropriate multiplexing techniques. This is also valid for the detection means 45 and 46, as well as the averaging means 49 and 50. Preferably, the circuit presented can be implemented in an Application Specific Integrated Circuit (ASIC) or suitable programmed processor means.

The arrangement can be used for measuring the quality of video transmissions as well as for measuring the quality of video codecs or any other video processing systems.

While the present invention has been described with respect to a particular embodiment, those skilled in the art will recognize that the present invention is not limited to the embodiments described and illustrated herein. Different embodiments and adaptions beside those shown and discussed as well as many variations, modifications and equivalent arrangements will now be reasonable suggested by the foregoing specification and drawings without departing from the substance or scope of the invention. Accordingly, it is intended that the invention be limited only by the spirit and scope of the claims appendant hereto.

What is claimed is:

1. A method of obtaining quality indicators for an objective assessment of a degraded or output video signal with respect to a reference or input video signal by quantifying the strength of edges or signal transitions in both the input and the output video signals using edge or signal transition detection, said method comprising:
   a first main step of generating image features of the input and output video signals, the image features including edge information, and
   a second main step of determining quality indicators from the generated image features, characterised in that the first main step includes the steps of:

a) detecting edges in the input and the output video signals, respectively (25, 27), and b) calculating the edginess of the input and the output video signals, providing input and output edge signals (26, 28); and the second main step includes the steps of:

c) establishing introduced edges in the output edge signal by comparing the input and output edge signals of corresponding parts of the input and output video signals (29), introduced edges being edges which are present in the output edge signal and are absent at corresponding positions in the input edge signal;

d) establishing omitted edges in the output edge signal by comparing the input and output edge signals of corresponding parts of the input and output video signals (33), omitted edges being edges which are present in the input edge signal and are absent at corresponding positions in the output edge signal;

e) obtaining normalised values of the introduced edges relative to the output edge signal adjusted by a first normalisation factor (30);

f) obtaining normalised values of the omitted edges relative to the input edge signal adjusted by a second normalisation factor (34);

g) calculating a first quality indicator by averaging the values obtained in step e) (31, 32); and h) calculating a second quality indicator by averaging the values obtained in step f) (35, 36).

2. A method according to claim 1, characterised in that i) the input and output edge signals are provided as corresponding unipolar signals;

j) the input and output edge signals of corresponding parts of the input and output video signals are aligned;

k) a bipolar distortion signal is established by difference building of the aligned input and output edge signals, and l) the introduced and omitted edges are established from the respective polarities of the distortion signal.

3. A method according to claim 1, characterised in that the first and second normalisation factors are set in accordance with the characteristics of the video signals.

4. A method according to claim 3, characterised in that the first and second normalisation factors comprise a constant part set in accordance with luminance and chrominance values of the video signals.

5. A method according to claim 3 characterised in that the first normalisation factor comprises a variable part obtained from maximum characteristic edge values of the video signals.

6. A method according to claim 1, characterised in that the input and output edge signals are provided from Sobel filtering.

7. A method according to claim 6, characterised in that the input and output edge signals are provided from improved or smeared Sobel filtering.

8. A method according to claim 1, characterised in that the first and second quality indicators are obtained for either luminance and/or chrominance signals of the input and output video signals.

9. A method according to claim 8, characterised in that for the luminance signals a constant part of the first normalisation factor is in a range between 15 and 30, preferably 20, a constant part of the second normalisation factor is in a range between 5 and 15, preferably 10, and a variable part of the first normalisation factor is in a range between 0.3 and 1, preferably 0.6, times a maximum value of the luminance signal of the input and output video signals.

10. A method according to claim 9, characterised in that for the chrominance signals the constant part of the first and second normalisation factors is in a range between 5 and 15, preferably 10.

11. A method according to claim 8, a weighted quality indicator is obtained from the first and second quality indicators of each of the luminance and chrominance signals, and a Mean Opinion Score (MOS) is calculated from the obtained weighted quality indicators.

12. A method according to claim 11, characterised in that multiple linear regression techniques are used for weighing of the respective first and second quality indicators.

13. A method according to claim 1, characterised in that the normalisation factors and/or weighing of the quality indicators are set from quality indicators obtained from subjective quality data and calculated quality data.

14. An Application Specific Integrated Circuit (ASIC) adapted to include means for performing all the method steps of claim 1.

15. The method according to claim 1 wherein the method is adapted in measuring the quality of video codecs.

16. The method according to claim 1 wherein the method is adapted in measuring the quality of video transmissions.

17. An arrangement for obtaining quality indicators for an objective assessment of a degraded or output video signal with respect to a reference or input video signal by quantizing the strength of edges or signal transitions in both the input and the output video signals using edge or signal transition detection, said arrangement comprising:

means for generating image features of the input and output video signals, the image features including edge information, and means for determining quality indicators from the generated image features, characterised in that the means for generating image features include:

a) means (42, 43) for detecting edges in the input and the output video signals, respectively, and b) means (42, 43) for calculating the edginess of the input and the output video signals, providing input and output edge signals;

and the means for determining quality indicators include:

c) means (45) for establishing introduced edges in the output edge signal by comparing the input and output edge signals of corresponding parts of the input and output video signals, introduced edges being edges which are present in the output edge signal and are absent at corresponding positions in the input edge signal;

d) means (46) for establishing omitted edges in the output edge signal by comparing the input and output edge signals of corresponding parts of the input and output video signals, omitted edges being edges which are present in the input edge signal and are absent at corresponding positions in the output edge signal;

e) means (47) for obtaining normalised values of the introduced edges relative to the output edge signal adjusted by a first normalisation factor;

f) means (48) for obtaining normalised values of the omitted edges relative to the input edge signal adjusted by a second normalisation factor;

g) means (49) for calculating a first quality indicator (51) by averaging the values obtained in step e); and h) means (50) for calculating a second quality indicator (52) by averaging the values obtained in step f).

18. An arrangement according to claim 17, characterised in that the edge detection and calculation means comprise Sobel filter means.

19. An arrangement according to claim 17, characterised in that the edge detection and calculation means comprise improved or smeared Sobel filter means.

20. An arrangement according to claim 17, implemented in digital processor means.

21. An Application Specific Integrated Circuit (ASIC) adapted to include the arrangement of claim 17.

* * * * *